(12) United States Patent
Hoefling

(10) Patent No.: US 6,851,451 B2
(45) Date of Patent: Feb. 8, 2005

(54) METHOD AND APPARATUS FOR MANUFACTURING A VALVE BODY

(75) Inventor: Klaus Hoefling, Lohr (DE)

(73) Assignee: Bosch Rexroth AG, Lohr (DE)

( * ) Notice: Subject to any disclaimer, the term of this patent is extended or adjusted under 35 U.S.C. 154(b) by 139 days.

(21) Appl. No.: 10/203,364

(22) PCT Filed: Jan. 31, 2001

(86) PCT No.: PCT/DE01/00373

§ 371 (c)(1),
(2), (4) Date: Aug. 7, 2002

(87) PCT Pub. No.: WO01/59304

PCT Pub. Date: Aug. 16, 2001

(65) Prior Publication Data

US 2003/0037826 A1 Feb. 27, 2003

(30) Foreign Application Priority Data

Feb. 7, 2000 (DE) .......................................... 100 05 290

(51) Int. Cl.⁷ .............................................. F16K 11/07
(52) U.S. Cl. .............................. 137/625.3; 137/625.69; 137/625.34
(58) Field of Search ......................... 137/625.3, 625.34, 137/625.69

(56) References Cited

U.S. PATENT DOCUMENTS

| 3,817,276 A | * | 6/1974 | Schexnayder ............... 137/491 |
| 5,092,039 A | | 3/1992 | Gaskell ................. 29/890.142 |
| 6,397,890 B1 | * | 6/2002 | Mickelson et al. .... 137/625.34 |

FOREIGN PATENT DOCUMENTS

| DE | 41 08 272 C2 | 9/1992 |
| DE | 198 56 563 A1 | 6/2000 |

OTHER PUBLICATIONS

Grundler, Edgar: Lupenreines Erodieren oder Erodieren mit der Lupe. In: TR Transfer, Nr. 38, 1996, S. 44, 45.

* cited by examiner

*Primary Examiner*—John Fox
(74) *Attorney, Agent, or Firm*—Boyle Fredrickson Newholm Stein & Gratz S.C.

(57) ABSTRACT

What is disclosed is a method for manufacturing a valve piston, as well as a valve piston, wherein flow in the fine control range is determined through control windows formed by a through opening extending through the valve body.

19 Claims, 5 Drawing Sheets

METHOD AND APPARATUS FOR MANUFACTURING A VALVE BODY

BACKGROUND OF THE INVENTION

The invention relates to a method for manufacturing a valve body where control windows are formed in the range of a control edge. The invention moreover relates to a valve body that may be manufactured in accordance with a like method.

In control valves, chamfers or so-called fine control windows are formed at the control edges for the purpose of improved control of low flow rates. With the aid of such fine control windows it is possible to adjust progressive properties of the characteristic curve. The fine control windows may, e.g., be formed by milling, with the formation of very small-dimensioned control windows for controlling extremely small flow rates being difficult. What is also known are methods wherein the control windows are produced by EDM (electronic discharge milling) cavity sinking, which does, however, require considerable expense in order to ensure dimensional stability of the electrode.

SUMMARY OF THE PRESENT INVENTION

In contrast, the invention is based on the object of providing a method for manufacturing a valve body, as well as a valve body where the production of control windows is possible with minimum expense and with the required precision.

In accordance with the invention, the control windows are formed by a through opening extending through the valve piston transversely to the longitudinal axis. In the method according to the invention, this through opening is produced by means of wire EDM.

Thanks to using a wire electrode, it is possible to produce even minute control window geometries. In accordance with the method, there is no tool wear, allowing for high-precision series production.

It is another advantage that by the through opening two diametrically arranged control windows are formed in one operation, so that the expense in terms of production technology may be reduced in comparison with solutions producing each control window by a separate operation.

Preliminary trials showed that, as a result of the through opening extending through the entire piston cross-section, improved flow properties of the control valve including the valve body of the invention may be achieved.

The wires available in wire EDM permit formation of through openings having a width of 0.2 mm, so that even extremely small flow stages may be realized.

For introducing the wire electrode it is customarily necessary to form a starting bore which may, however, be formed by a conventional drilling process. As an alternative, however, this starting bore may also be formed through erosion or some other removal process.

The valve bodies of control valves traditionally include at least one ring collar formed in continuation of a radially set-back piston neck. In accordance with the invention it would be preferred for the starting bore to be formed in the range of the piston neck, with the through opening then extending from the starting bore into the ring collar having the peripheral control edge. This allows to produce the starting bore with a larger diameter than the control window, for in the range of the piston neck it has no bearing on the flow properties. Moreover it is possible to produce multiple-step fine control regions in one operation.

The flow properties of the valve provided with a valve body of the invention may be further improved if the control window is formed within or adjacent a fine control notch having a larger surface. This fine control notch may then be produced in a conventional manner by milling or EDM cavity sinking. The flow properties upon opening the valve are then initially determined by the geometry of the fine control notch, and by the geometry of the control window upon further opening.

Other advantageous developments of the invention are subject matters of the additional subclaims.

BRIEF DESCRIPTION OF THE DRAWINGS

Preferred embodiments of the invention shall hereinbelow be explained more closely by referring to schematic drawings, wherein:

FIG. 1 shows a longitudinal sectional view of proportional adjustment control valve 1. In a valve housing 2 of the control valve 1 a valve bore 4 is formed wherein a valve piston 6 is guided in sliding axial displacement. The valve housing 2 includes a tank port not shown here, which is also connected to the valve bore 4 via two tank passages 8, 10. A pressure port, equally not shown, is connected to the valve bore 6 via a pressure passage 12. The control valve 1 moreover includes two work ports A, B from which work passages 14 and 16, respectively, lead to the axial bore. In the opening range of the passages 8, 10, 12, 14, 16 the valve bore 4 includes annular spaces 18, 26 (tank passages 8, 10), 20, 24 (work passages 14, 16) and 22 (pressure passage 12). The peripheral edges of the annular spaces adjacent the valve piston 6 have the form of control edges.

Figure 1:
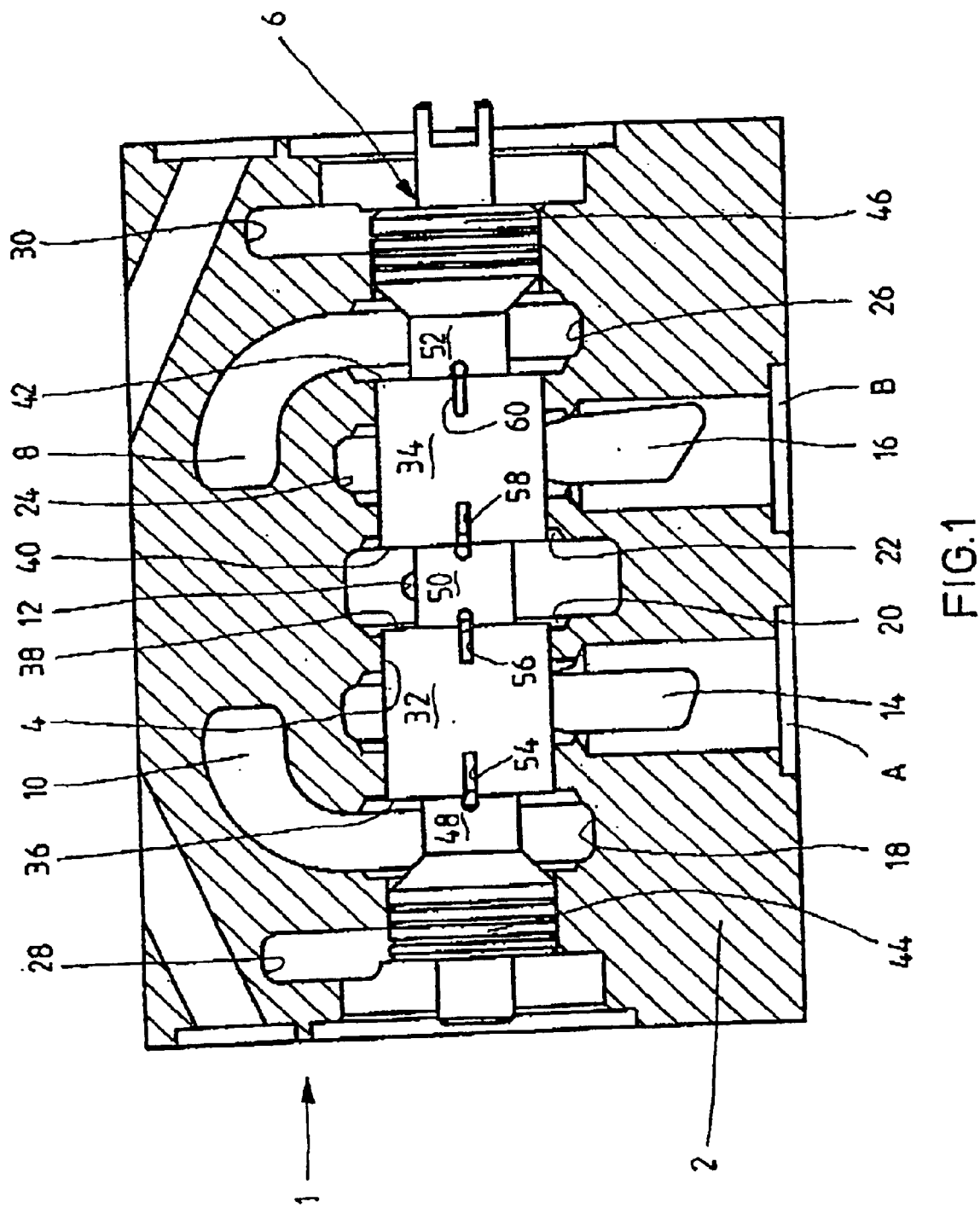
FIG. 1 is a sectional view of a control valve including a valve piston according to the invention.

The two end faces of the valve piston 6 may receive application of the tank pressure or of a control pressure via passages 28, 30. Moreover it is possible for spring elements to act on the end faces of the piston, or the control piston may be connected to a control magnet via a coupling mechanism.

The valve piston 6 possesses two central, spaced ring collars 32, 34, the peripheral edges of which form control edges 36, 38, 40 and 42. The end portions of the valve piston 6, which are guided in the valve bore, are formed by end face collars 44, 46. The radially set-back piston necks formed between the mentioned collars 44, 32, 34 and 46 are designated by reference numerals 48, 50 and 52 in FIG. 1.

Figure 2:
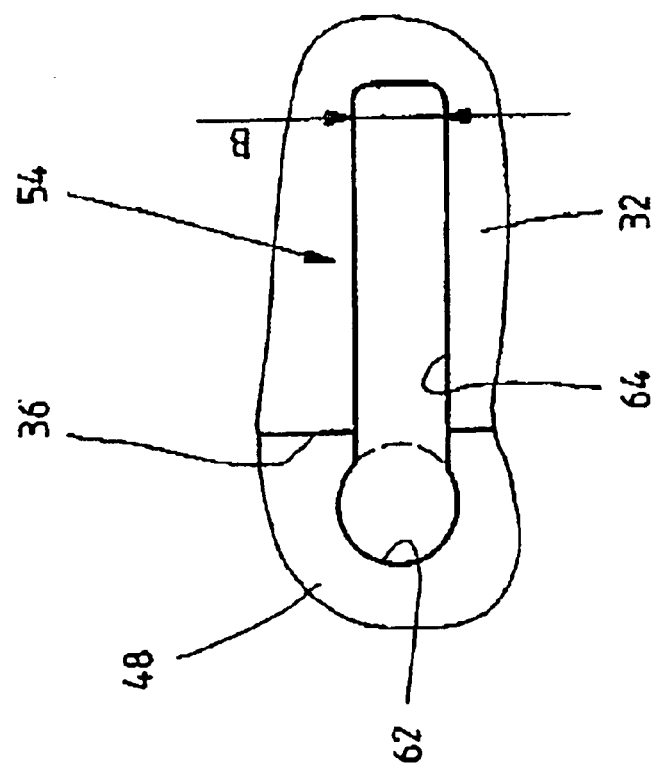
FIG. 2 is a detail of a control window of the valve piston of FIG. 1.

In the range of the control edges 36, 38, 40, 42, two control windows 54, 56, 58, 60 each are formed which are arranged diametrically to each other and about parallel to the axis, and the geometries of which are explained with the aid of FIG. 2. The respective second control window, not visible in FIG. 1, is arranged below the plane of the drawing.

FIG. 2 shows an enlarged representation of the control window 54 formed in the control edge 36 of the ring collar 32.

Each control window 54 extends from the adjacent piston neck—piston neck 48 in the representation of FIG. 2—into the respective ring collar 32 . . . . The two control windows 54, superposed in the plane of drawing, are defined by the peripheral edges of a through opening formed perpendicular to the plane of drawing in FIG. 2. The fact that the control windows 54, 56, 58, 60 represented in the figure are formed by a through opening may also be taken from the circumstance that the peripheral edges of the annular spaces are visible at the bottom of the through opening. This through opening, which extends transversely to the axis of the valve piston 6, is produced by wire EDM. In a like spark erosive removal process, a pulsating direct voltage is applied to the workpiece and to a wire electrode. Between the wire electrode and the workpiece a dielectric material is positioned which is caused to become conductive by ions and material particles engendered by the pulsating direct voltage. This results in spark-over along a discharge channel between the wire electrode and the workpiece, resulting in temperatures of up to 12,000° C., so that material particles melt and evaporate during the discharge period. At the end of a pulse, the discharge channel collapses, and the material particles are flung out from the spark gap.

The material of the wire electrode is selected such that material erosion on the electrode is negligible in comparison with material erosion on the workpiece. In wire EDM, the wire electrode is commonly unreeled from a store, with virtually no dimensional change of the wire electrodes being detectable during the erosive processing as a result.

The minimum dimension of the through opening formed by the wire electrode is limited by the wire diameter. It presently does not pose any problems to form slit widths of 0.2 mm by way of the wire-EDM process.

In the method of the invention, initially a starting bore 62 is formed which extends through the piston neck 56 in a radial direction in the embodiment represented in FIG. 2. The starting bore 62 may be formed in a conventional manner by drilling or EDM cavity sinking.

Figure 3:
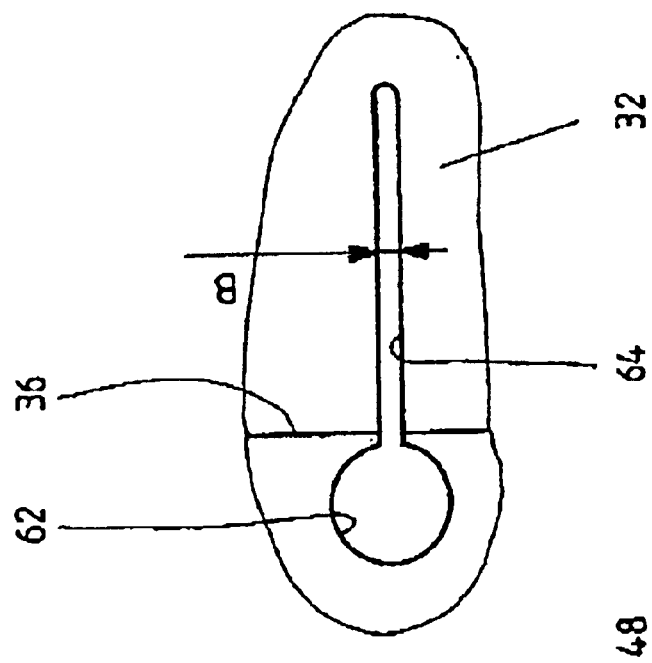
FIG. 3 is a variant of the control window represented in FIG. 2.

Following formation of the starting bore 62, the wire electrode is introduced and a control slot 64 is eroded. This control slot 64 may have a width B smaller than the diameter of the Starting bore. Depending on the diameter of the wire electrode, the control slot 64 may be formed, starting out from the starting bore 62, by circumscribing a transversal section, e.g. a rectangle, or, however, as indicated in FIG. 3, merely by erosion of a control slot 64 having a width B corresponding to the diameter of the wire electrode. I.e., in the latter case the wire electrode moves from the starting bore 62 into the ring collar 32 in an axial direction, with the control slot 64 being formed fully in the process, whereas in the embodiment represented in FIG. 2, the peripheral edge of the control slot 64 is formed by circumscribing with the wire electrode, i.e., the erosion process starts and ends inside the starting bore 62.

Forming the starting bore 62 with an enlarged diameter in the piston neck 48 has the advantage of the flow properties upon opening the control piston 6 not being influenced by the geometry of the starting bore 62. It is, however, very well possible to also form this starting bore 62 in a suitable location of the ring collar 32.

Figure 4:
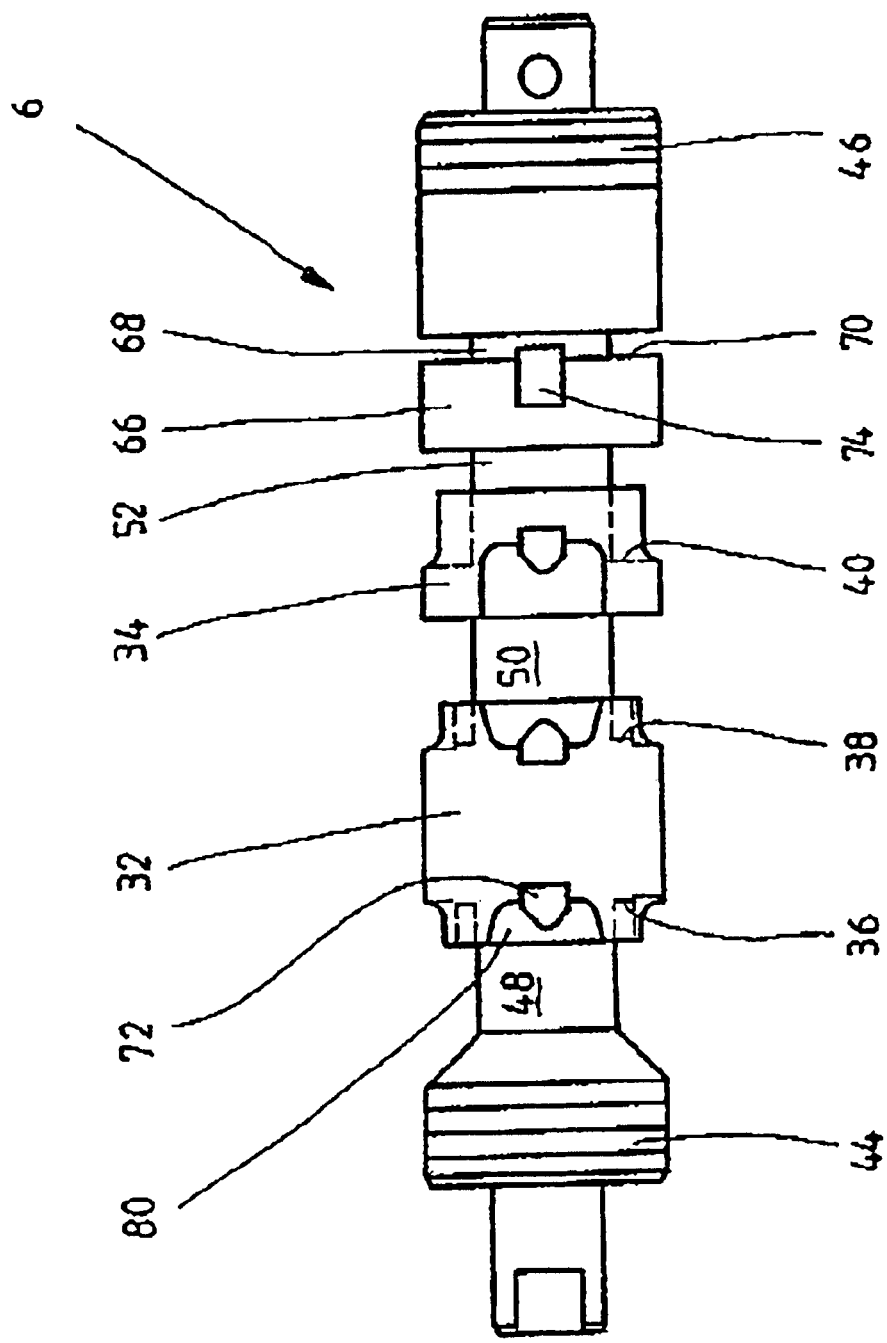
FIG. 4 is another embodiment of a valve piston of a control valve.

FIG. 4 shows another embodiment of a valve piston 6 which, in turn, at its end side is again formed with the two end face collars 44, 46 and the elements for supporting a control spring or for connection to an electromagnet. The valve piston 6 represented in FIG. 4 includes three ring collars 32, 34 and 66, with a respective piston neck 48, 50, 52 and 68 being formed between the collars.

The two end-side peripheral edges of the ring collar 32 are chamfered concavely, so that the control edges 36, 38 are displaced in a radial inward direction relative to the end faces.

The another ring collar 34 is reduced in a radial direction towards the piston neck 52, so that the associated control edge 40 is also set back relative to the two end faces.

At the third ring collar 66 arranged between the end face collar 46 and the ring collar 40, an end face-side control edge 70 is formed.

Each one of the above mentioned control edges 36, 38, 40 and 70, respectively, has control windows 72 or 74 arranged diametrically to each other. The control windows 72 of the control edges 36, 38, 40 shall be explained by way of the detail of FIG. 5, and the geometry of the control window 74 of the control edge 70 shall be explained by way of the detail of FIG. 6.

Figure 5:
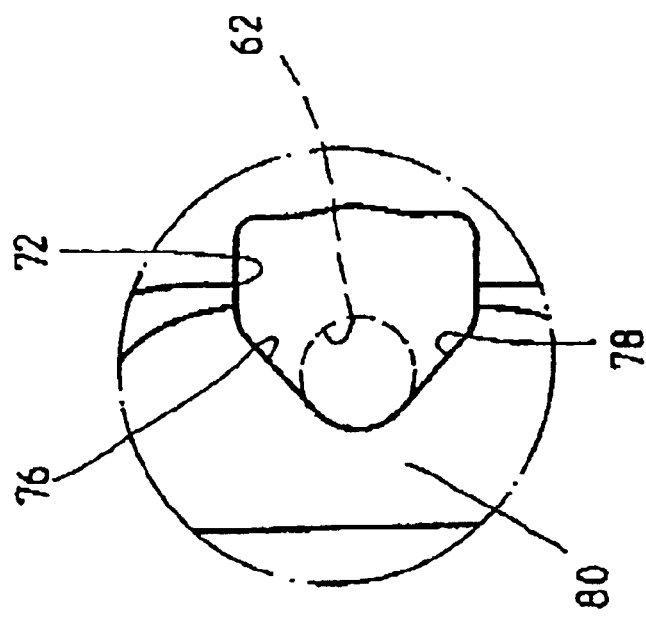

In accordance with the representation in FIG. 5, the through opening forming the control window 72 has a cross-section approximately in the form of a trapezoid profile, with two sides of the trapeze approaching each other in a roof shape. In the range of the apex of the two walls 76, 78 obliquely approaching each other, the starting bore 62 indicated in phantom line is formed which extends through the valve piston 6 in a radial direction. Accordingly, the apex of the through opening is formed by this starting bore 62, the two walls 76, 78 extend tangentially to the peripheral edge of the starting bore 62.

Starting out from this starting bore 62 formed by drilling or EDM cavity sinking, the described trapezoid shape is then formed with the aid of a wire electrode. In the embodiment represented in FIGS. 4 and 5, each of the control windows 72 co-operates with a trough-shaped control notch 80 formed in the chamfered region of the ring collar 32 forming the control edge. This trough-shaped control notch 80 is produced in a conventional manner by milling, EDM cavity sinking or the like. The control window 72 determines flow properties at a small degree of opening.

Figure 6:
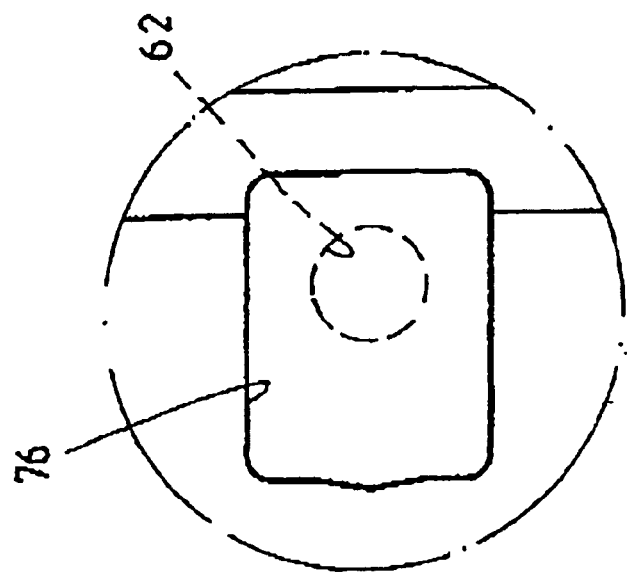
FIGS. 5, 6 are details of the valve piston of FIG. 4.

In FIG. 6 representing the detail Y, the geometry of the control window 74 of the right-hand ring collar 66 in FIG. 4 can be seen. This control window 74 is formed by a through opening having an approximately rectangular cross-section which extends through both the adjacent piston neck 68 and also part of the ring collar 66 in a radial direction. In the above described embodiment in accordance with FIG. 5, the through opening constituting the control window 72 only extends through the ring collar 32 or 34, respectively.

As is indicated in phantom line in FIG. 6, the starting bore 62 is formed at a spacing from the peripheral walls formed later on within the ring collar 66. Starting out from this starting bore 62, the through. opening having the approximately rectangular cross-section is then formed by wire electrode, so that a control window is obtained which has a comparatively large opening section, and the cross-section of flow of which linearly increases upon an opening movement of the valve piston in the radial direction. In the case of the control window represented in FIG. 5, the clear width of the opening in the fine control range depends on the piston stroke.

As can be seen from the above embodiments, virtually any desired control window shape may be formed by wire EDM, with a limitation only existing as a result of the minimum diameter of a wire.

Figure 7:
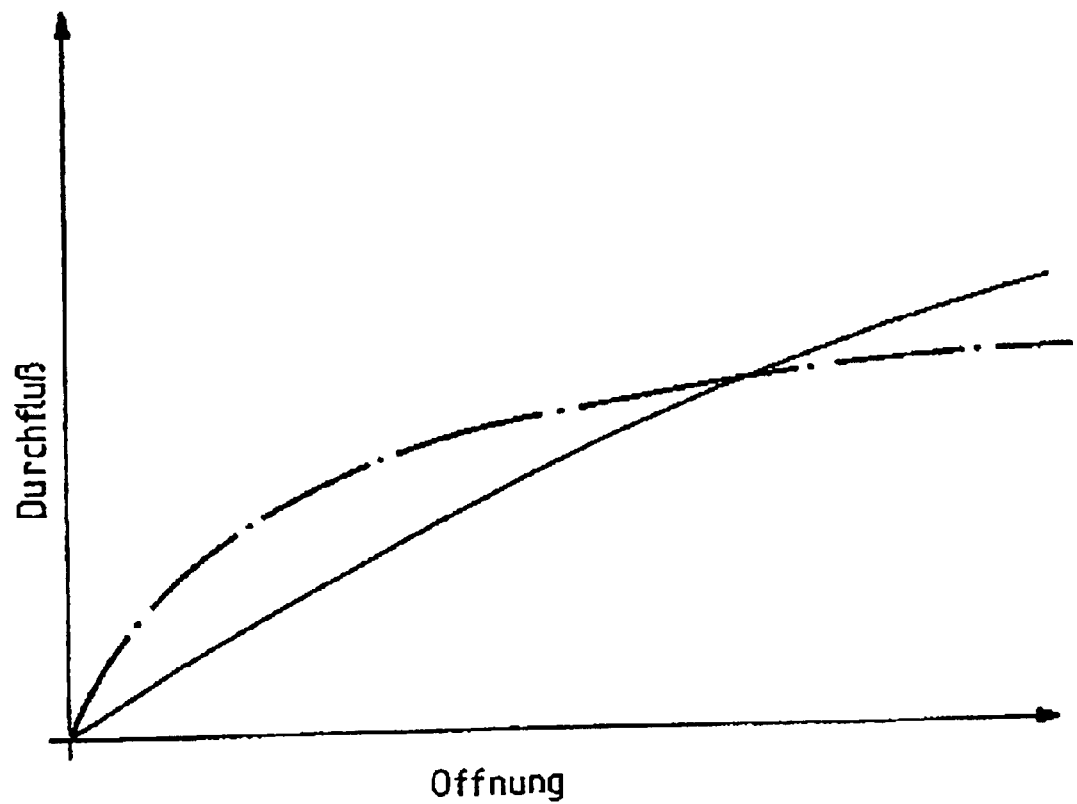
FIG. 7 shows a characteristic curve of a control valve realized with a valve piston in accordance with the invention.

Possible drawbacks to be named in the case of continuous formation of control windows, such as a reduced bending strength of the valve piston and a pressure-dependent, partial expansion of diameter of the piston in the range of the through openings, are outweighed by the attained advantages, such as high-precision serial manufacture, formation of minute structures in order to realize small flows, simultaneous processing of two control windows, and improved flow properties. The latter advantage shall be explained by referring to FIG. 7 which shows the characteristic curves of a conventional control valve and of a control valve comprising the valve piston of the invention. What is represented is the dependency of flow on the opening of the cross-section of flow.

The dash-dotted line shows the characteristic curve of a conventional valve, wherein initially an increase of flow approximately proportional with the opening is observed. The gradient of the characteristic curve does then, however, strongly decrease with an increasing opening, so that the response characteristics of the valve are deteriorated at larger openings. The characteristic curve represented as a solid line shows an embodiment wherein the control windows are formed with identical geometries as in the dash-dotted embodiment, however the control windows were realized as through openings within the meaning of the invention. The characteristic curve reveals that solely by using the through opening in accordance with the invention, the properties of flow through the enlarged cross-section of outgoing flow are improved substantially, resulting in a nearly linear characteristic curve.

What is disclosed is a method for manufacturing a valve piston, as well as a valve piston, wherein flow in the fine control range is determined through control windows formed by a through opening extending through the valve body.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method for manufacturing a valve body, the method comprising the steps of:
forming at least one control window in the range of a control edge, characterized in that a through opening extending radially through said valve body is formed using wire EDM, with at least one of a plurality of end face edges of said valve body defining at least a part of said at least one control window.

2. A method in accordance with claim 1, further comprising the step of producing a starting bore prior to formation of said through opening.

3. A method in accordance with claim 1, wherein said control window is formed at a control edge defined by a ring collar, and wherein said starting bore is formed in a piston neck adjacent said ring collar, and said through opening extends into said ring collar.

4. A method in accordance with claim 2, wherein said control window is formed at a control edge defined by a ring collar, and wherein said starting bore is formed in a piston neck adjacent said ring collar, and said through opening extends into said ring collar.

5. A method in accordance with claim 2, wherein a control slot having a reduced width is formed starting out from said starting bore.

6. A method in accordance with claim 1, wherein a control notch is formed which, jointly with said control window, forms a fine control notch.

7. A method in accordance with claim 6, wherein said control notch is formed using one of a group including milling and EDM cavity sinking.

8. A method in accordance with claim 2, wherein a control notch is formed which, jointly with said control window, forms a fine control notch.

9. A method in accordance with claim 8, wherein said control notch is formed using one of a group including milling and EDM cavity sinking.

10. A valve body for a valve assembly, the valve body comprising:
a pair of control windows;
a pair of control edges to which said control windows are associated; and
wherein said pair of control windows are arranged diametrically to each other and are formed by peripheral edges of a through opening extending radially through said valve body.

11. A valve body in accordance with claim 10, wherein said through opening is produced by erosion.

12. A valve body in accordance with claim 10, wherein said through opening is produced by wire EDM.

13. A valve body in accordance with claim 10, wherein said through opening is formed starting out from a piston neck and extending as far as into a ring collar of said valve body.

14. A valve body in accordance with claim 11, wherein said through opening is formed starting out from a piston neck as far as into a ring collar of said valve body.

15. A valve body in accordance with claim 10, further comprising at least one starting bore associated with at least one of said pair of control windows, and wherein said starting bore has a larger diameter than a diameter of at least one of said pair of control windows.

16. A valve body for a valve assembly, the valve body including a ring collar and a piston neck, the valve body comprising:
at least one control window, the at least one control window extending from the piston neck into the ring collar of the valve body; and
at least one starting bore associated with the at least one control window, wherein the control window includes a through opening extending radially through the valve body.

17. A valve body in accordance with claim 16, wherein the through opening is formed using one of a group including erosion and wire EDM.

18. The valve body in accordance with claim 16, wherein the at least one control window further comprises a control slot in communication with the starting bore, the control slot having a reduced width relative to the starting bore.

19. The valve body in accordance with claim 16, wherein the starting bore has a larger diameter than a diameter of the control window.

* * * * *